(12) United States Patent
Peters

(10) Patent No.: US 9,208,111 B2
(45) Date of Patent: Dec. 8, 2015

(54) TRIGGERING PROCESSING OF NETWORK REQUESTS

(71) Applicant: John A. Peters, Roseville, MN (US)

(72) Inventor: John A. Peters, Roseville, MN (US)

(73) Assignee: UNISYS CORPORATION, Blue Bell, PA (US)

( * ) Notice: Subject to any disclaimer, the term of this patent is extended or adjusted under 35 U.S.C. 154(b) by 0 days.

(21) Appl. No.: 14/082,306

(22) Filed: Nov. 18, 2013

(65) Prior Publication Data

US 2015/0143385 A1     May 21, 2015

(51) Int. Cl.
*G06F 15/17*     (2006.01)
*G06F 13/20*     (2006.01)
*G06F 9/46*     (2006.01)

(52) U.S. Cl.
CPC ............... *G06F 13/20* (2013.01); *G06F 9/466* (2013.01); *G06F 15/17* (2013.01)

(58) Field of Classification Search
CPC ...................................................... G06F 13/20
See application file for complete search history.

(56) References Cited

U.S. PATENT DOCUMENTS 5,404,523 A * 4/1995 DellaFera et al. ............ 718/101

OTHER PUBLICATIONS

Cooper, E., "Protocol implementation on the Nectar communication processor" (1990), Techinical Report, pp. 1-17 [retrieved from http://repository.cmu.edu/cgi/viewcontent.cgi?article=3000&context=compsci].*

* cited by examiner

*Primary Examiner* — Brian W Wathen
(74) *Attorney, Agent, or Firm* — Richard J. Gregson

(57) ABSTRACT

A network handler may be triggered to process input/output requests placed on a network queue to reduce latency compared to occasionally polling the network queue for new input/output requests. A method for processing network input/output requests may include receiving, by a processor, an input/output request for a network device; placing, by the processor, on a network queue the input/output request; and triggering, by the processor, a handler for the network queue.

15 Claims, 5 Drawing Sheets

TRIGGERING PROCESSING OF NETWORK REQUESTS

FIELD OF THE DISCLOSURE

The disclosure relates to computer networks. More specifically, this disclosure relates to processing network requests.

BACKGROUND

Network systems permeate computer technology, and likewise everyday business operations. Networks interconnect computer systems in nearby locations with computers systems in remote locations. Networks carry data, such as business transactions ranging from cargo waybills to financial transactions. Each business transaction sends and receives data over a computer network, and millions of business transactions may occur in a day or an hour. Latency in handling network traffic can cause delays and decrease productivity in businesses. Thus, there is a continuing desire to decrease latency in computer networks and computer systems.

Conventional computer networking systems employ, for example, a circular queue for managing network data. FIG. 1 is a block diagram illustrating a conventional network queue for processing network requests received from an application. A circular queue 102 includes, for example, locations 102A and 102B, When an application 104 needs to transfer data over a network, the application inserts the data into the queue 102, such as into location 102A. Although only one application 104 is shown, multiple applications may be inserting data into the queue 102. A network handler 106 occasionally polls the queue 102 to determine if new data is in the queue 102 for transmission through a network adapter 108. The handler 106 may be part of an operating system executing on a computer system including the network adapter 108. When the handler 106 determines new data is ready for transmission through the network adapter 108, the handler retrieves the data from the queue 102 and controls the network adapter 108 to transmit the data.

Polling the network queue 102 by the handler 106 delays processing of network requests until the next polling event. The average latency of processing a network request is generally half of the poll rate for polling the network queue. This delay adds a significant amount of latency that detracts from performance of the network interface.

SUMMARY

Processing of network requests may instead by triggered when the network request is available. That is, even when the network request is made in-between polling events of a handler of the network queue, processing of a new network request may be triggered. This reduces or eliminates the latency associated with waiting for the next polling event to process the network request.

According to one embodiment, a method includes receiving, by a processor, an input/output request for a network device. The method also includes placing, by the processor, on a network queue the input/output request. The method further includes triggering, by the processor, a handler for the network queue.

According to another embodiment, a computer program product includes a non-transitory computer-readable medium having code to perform the steps of receiving an input/output request for a network device; placing on a network queue the input/output request; and triggering a handler for the network queue.

According to yet another embodiment, an apparatus may include a memory and a processor coupled to the memory. The processor may be configured to execute the steps of receiving, by the processor, an input/output request for a network device; placing, by the processor, on a network queue the input/output request; and triggering, by the processor, a handler for the network queue.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
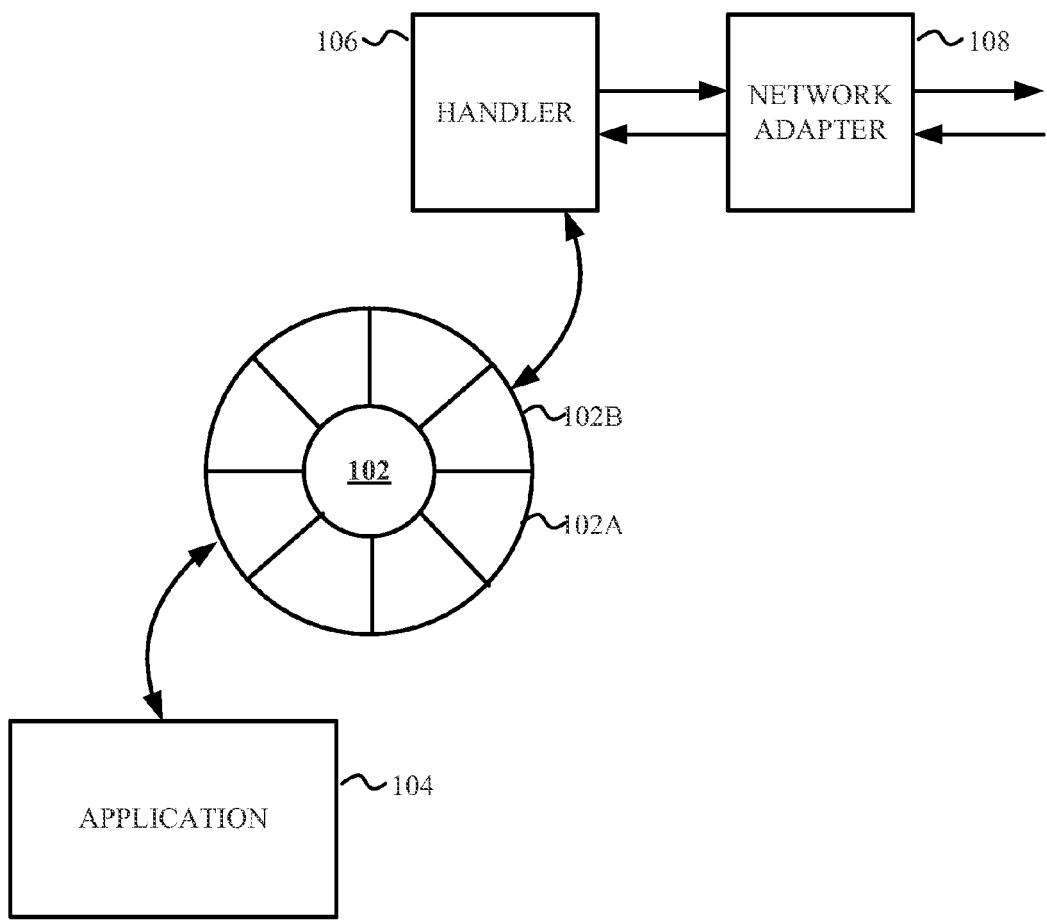
FIG. 1 is a block diagram illustrating a conventional network queue for processing network requests received from an application.
Figure 2:
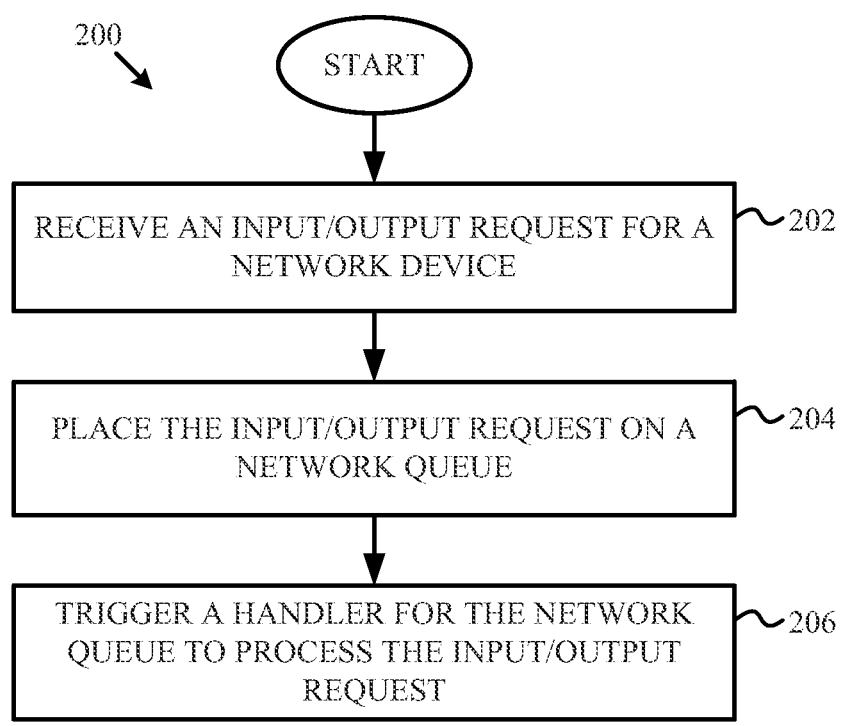
FIG. 2 is a flow chart illustrating a method of processing network requests from a network queue without polling according to one embodiment of the disclosure.

FIG. 2 is a flow chart illustrating a method of processing network requests from a network queue without polling according to one embodiment of the disclosure. A method 200 begins at block 202 with receiving an input/output request for a network device. For example, an application may transmit to a communications protocol stack, or an operating system, an input/output request for a network device. The input/output request my be assigned a transaction ID, may specify a specific network device in an interface ID, and/or may specify a particular queue for the network device, such as an input queue or an output queue, with a queue number. At block 204, the input/output request may be placed on a network queue.

At block 206, a handler may be triggered for the network queue to initiate the handler processing of the input/output request. The communications protocol stack or operating system may call a network handler thread running to process the input/output request. For example, the application making the input/output request may be executing in a virtual host. The application may queue an input/output request for the network adapter. A trigger may then be generated and transmitted to a network handler executing outside of the virtual host to cause transmission of the input/output request through the network device. In one embodiment, the trigger may wake up the network handler. After the network handler wakes up, the network handler may access the network queue to process the input/output request.

Figure 3:
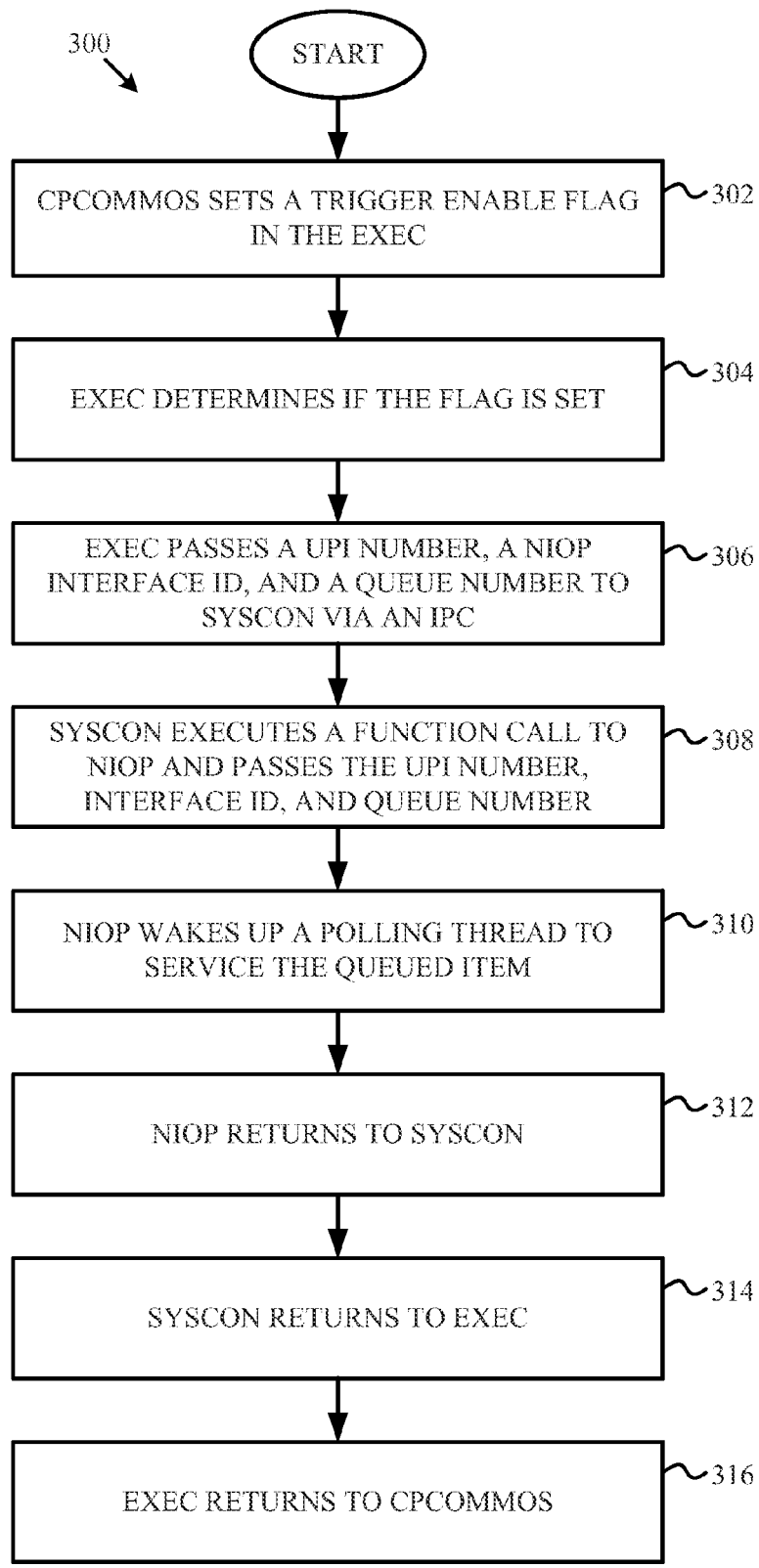
FIG. 3 is a flow chart illustrating a method of processing network requests from a network queue without polling according to another embodiment of the disclosure.

FIG. 3 is a flow chart illustrating a method of processing network requests from a network queue without polling according to another embodiment of the disclosure. A method 300 allows the implementation of the method 200 described above in FIG. 2 with respect to a system configuration having a program implementing network APIs, such as CPCommOS, which requests an operating system, such as Exec, to notify a network request manager, such as NIOP, when an item is placed onto a queue so that NIOP has the opportunity to service the item immediately and thus eliminate the latency introduced by polling.

The method 300 begins at block 302 with CPCommOS setting a trigger enable flag in the Exec to set triggering as a method of processing network requests. If the trigger enable flag is not set, then processing of network requests may be completed through polling. Specifically, in the NET$OUT and NET$IN packet that CPCommOS passes to the Exec, a 'flag' cell may be implemented. If the flag is set, the Exec will notify the MOP.

At block 304, the Exec determines whether the flag is set, if so, then the method 300 continues to execute blocks 306, 308, 310, 312, 314, and 316. At block 306, the Exec may pass at least one of the UPI number, NIOP interface ID, and queue number (e.g., network outbound queue (NOQ) or network inbound queue (NIQ)) to a system controller, such as SysCon, via an inter process communication (IPC), such as subfunction 031. At block 308, SysCon may execute a function call to the NIOP, such as the fnUpiNotify function, and pass the UPI number, interface ID, and/or queue number, At block 310, the NIOP may 'wake up' the thread that was polling the queue to allow the thread to service the queued item. At block 312, the NIOP returns to SysCon. At block 314, the SysCon returns to the Exec. At block 316, the Exec returns to CPCommOS.

In comparison in conventional systems, CPCommOS places an item on the NOQ or NIQ by calling the Exec NET$OUT or NET$IN interfaces respectively. The Exec places the item onto the corresponding circular queue and it is up to the NIOP to service the request by polling the queues for work items. When the INIOP is polling the queues for work, the average latency added to the service time of the request may be half the poll rate.

Figure 4:
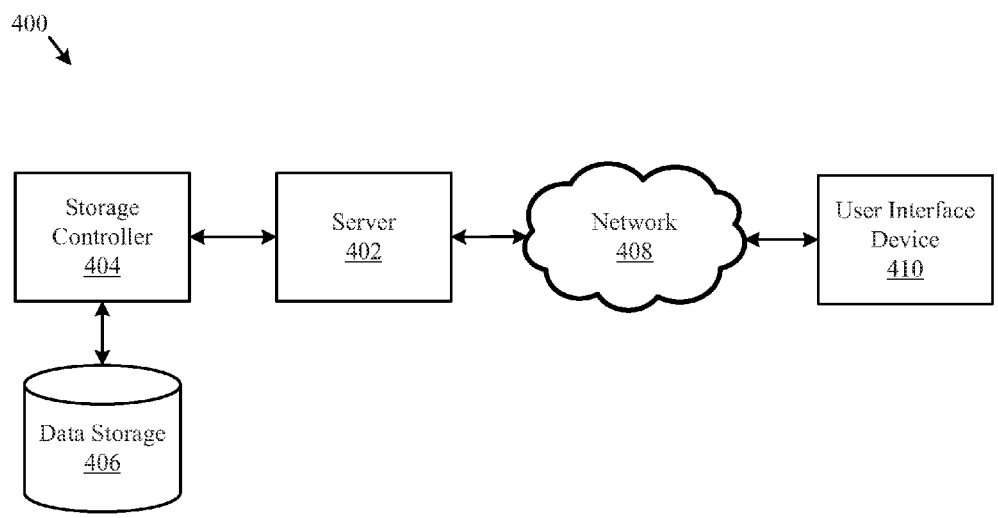
FIG. 4 is a block diagram illustrating a computer network according to one embodiment of the disclosure.

FIG. 4 illustrates one embodiment of a system 400 for an information system, including a system for executing applications and transmitting/receiving data over a network, The system 400 may include a server 402, a data storage device 406, a network 408, and a user interface device 410. In a further embodiment, the system 400 may include a storage controller 404, or storage server configured to manage data communications between the data storage device 406 and the server 402 or other components in communication with the network 408. In an alternative embodiment, the storage controller 404 may be coupled to the network 408.

In one embodiment, the user interface device 410 is referred to broadly and is intended to encompass a suitable processor-based device such as a desktop computer, a laptop computer, a personal digital assistant (PDA) or tablet computer, a smartphone or other a mobile communication device having access to the network 408. In a further embodiment, the user interface device 410 may access the Internet or other wide area or local area network to access a web application or web service hosted by the server 402 and may provide a user interface for enabling a user to enter or receive information, such as setting a trigger enable flag.

The network 408 may facilitate communications of data between the server 402 and the user interface device 410. The network 408 may include any type of communications network including, but not limited to, a direct PC-to-PC connection, a local area network (LAN), a wide area network (WAN), a modern-to-modem connection, the Internet, a combination of the above, or any other communications network now known or later developed within the networking arts which permits two or more computers to communicate.

Figure 5:
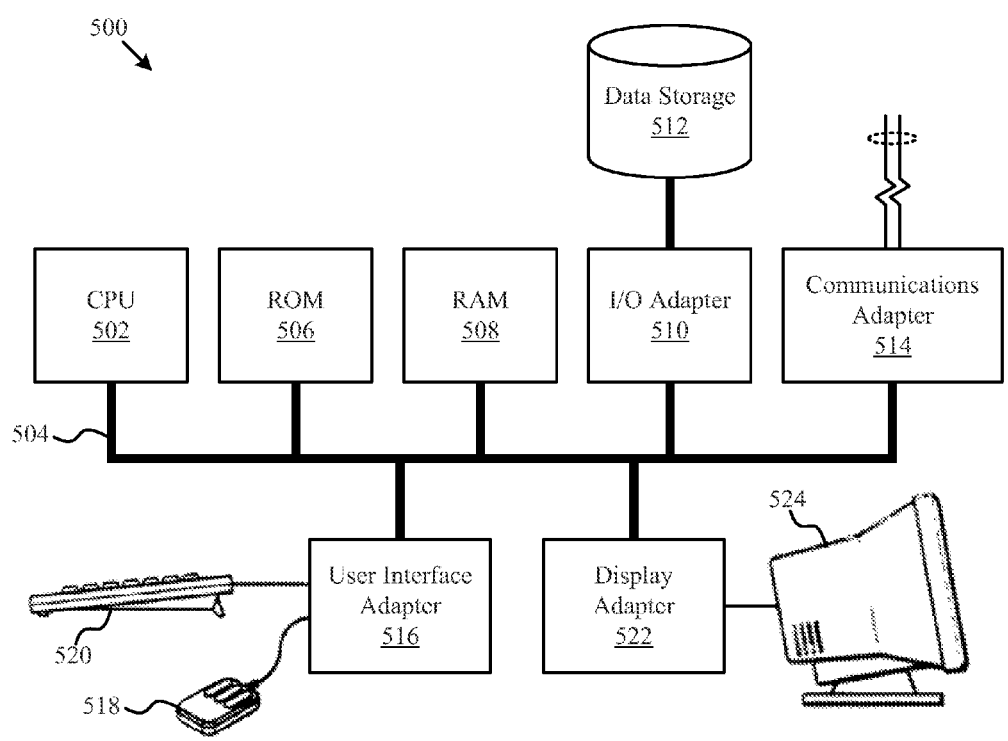
FIG. 5 is a block diagram illustrating a computer system according to embodiment of the disclosure.

FIG. 5 illustrates a computer system 500 adapted according to certain embodiments of the server 402 and/or the user interface device 410. The central processing unit ("CPU") 502 is coupled to the system bus 504. The CPU 502 may be a general purpose CPU or microprocessor, graphics processing unit ("GPU"), and/or microcontroller. The present embodiments are not restricted by the architecture of the CPU 502 so long as the CPU 502, whether directly or indirectly, supports the operations as described herein. The CPU 502 may execute the various logical instructions according to the present embodiments.

The computer system 500 also may include random access memory (RAM) 508, which may be synchronous RAM (SRAM), dynamic RAM (DRAM), synchronous dynamic RAM (SDRAM), or the like. The computer system 500 may utilize RAM 508 to store the various data structures used by a software application. The computer system 500 may also include read only memory (ROM) 506 which may be PROM, EPROM, EEPROM, optical storage, or the like. The ROM may store configuration information for booting the computer system 500. The RAM 508 and the ROM 506 hold user and system data, and both the RAM 508 and the ROM 506 may be randomly accessed.

The computer system 500 may also include an input/output (I/O) adapter 510, a communications adapter 514, a user interface adapter 516, and a display adapter 522. The I/O adapter 510 and/or the user interface adapter 516 may, in certain embodiments, enable a user to interact with the computer system 500. In a further embodiment, the display adapter 522 may display a graphical user interface (GUI) associated with a software or web-based application on a display device 524, such as a monitor or touch screen.

The I/O adapter 510 may couple one or more storage devices 512, such as one or more of a hard drive, a solid state storage device, a flash drive, a compact disc (CD) drive, a floppy disk drive, and a tape drive, to the computer system 500. According to one embodiment, the data storage 512 may be a separate server coupled to the computer system 500 through a network connection to the I/O adapter 510. The communications adapter 514 may be adapted to couple the computer system 500 to the network 408, which may be one or more of a LAN, WAN, and/or the Internet. The user interface adapter 516 couples user input devices, such as a keyboard 520, a pointing device 518, and/or a touch screen (not shown) to the computer system 500. The keyboard 520 may be an on-screen keyboard displayed on a touch panel. The display adapter 522 may be driven by the CPU 502 to control the display on the display device 524. Any of the devices 502-522 may be physical and/or logical.

The applications of the present disclosure are not limited to the architecture of computer system 500. Rather the computer system 500 is provided as an example of one type of computing device that may be adapted to perform the functions of the server 402 and/or the user interface device 410. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 500 may be virtualized for access by multiple users and/or applications.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data, The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
  receiving, by a processor, an input/output request for a network device;
  placing, by the processor, on a network queue the input/output request;
  determining whether a triggering flag is enabled before triggering the handler; and
  triggering, by the processor, a handler for the network queue, in which the step of triggering is performed when the triggering flag is determined to be enabled to process the input/output request.

2. The method of claim 1, in which the step of placing comprises passing at least one of a transaction ID, an interface ID, and a queue number for the input/output request.

3. The method of claim 2, in which the step of triggering comprises passing the transaction ID to the handler.

4. The method of claim 1 in which the step of triggering comprises waking up a handler thread.

5. The method of claim 1, further comprising processing, by the handler, of the network queue to process the input/output request.

6. A computer program product, comprising:
  a non-transitory computer-readable medium comprising code to execute the steps of:
    receiving an input/output request for a network device;
    placing on a network queue the input/output request;
    determining whether a triggering flag is enabled before triggering the handler; and
    triggering a handler for the network queue, in which the step of triggering is performed when the triggering flag is determined to be enabled to process the input/output request.

7. The computer program product of claim 6, in which the step of placing comprises passing at least one of a transaction ID, an interface ID, and a queue number for the input/output request.

8. The computer program product of claim 7, in which the step of triggering comprises passing the transaction ID to the handler.

9. The computer program product of claim 6, in which the step of triggering comprises waking up a handler thread.

10. The computer program product of claim 6, in which the medium further comprises code to execute the step of processing, by the handler, of the network queue to process the input/output request.

11. An apparatus, comprising:
  a memory;
  a processor coupled to the memory, in which the processor is configured to execute the steps of:
    receiving, by a processor, an input/output request for a network device;
    placing, by the processor, on a network queue the input/output request;
    determining whether a triggering flag is enabled before triggering the handler; and
    triggering, by the processor, a handler for the network queue, in which the step of triggering is performed when the triggering flag is determined to be enabled to process the input/output request.

12. The apparatus of claim 11, in which the step of placing comprises passing at least one of a transaction ID, an interface ID, and a queue number for the input/output request.

13. The apparatus of claim 12, in which the step of triggering comprises passing the transaction ID to the handler.

14. The apparatus of claim 11, in which the step of triggering comprises waking up a handler thread.

15. The apparatus of claim 11, in which the processor is further configured to execute the step of processing, by the handler, of the network queue to process the input/output request.

* * * * *